United States Patent
Farivar et al.

(10) Patent No.: US 10,986,494 B1
(45) Date of Patent: Apr. 20, 2021

(54) MULTI CELL PHONE TOWER INFORMATION TRANSFER SECURITY

(71) Applicant: Capital One Services, LLC, McLean, VA (US)

(72) Inventors: Reza Farivar, Champaign, IL (US); Anh Truong, Champaign, IL (US); Jeremy Goodsitt, Champaign, IL (US); Austin Walters, Savoy, IL (US); Vincent Pham, Champaign, IL (US); Galen Rafferty, Mahomet, IL (US); Mark Watson, Sedona, AZ (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/657,741

(22) Filed: Oct. 18, 2019

(51) Int. Cl.
*H04W 12/00* (2009.01)
*H04L 1/00* (2006.01)
*H04L 9/16* (2006.01)
*H04W 36/00* (2009.01)

(52) U.S. Cl.
CPC ....... *H04W 12/0013* (2019.01); *H04L 1/0057* (2013.01); *H04L 1/0072* (2013.01); *H04L 9/16* (2013.01); *H04W 36/0016* (2013.01); *H04L 2209/80* (2013.01)

(58) Field of Classification Search
CPC .......... H04W 12/0013; H04W 36/0016; H04L 2209/80; H04L 1/0057; H04L 1/0072; H04L 9/16
See application file for complete search history.

(56) References Cited

U.S. PATENT DOCUMENTS

| | | | | |
|---|---|---|---|---|
| 6,097,961 | A * | 8/2000 | Alanara | H04W 4/14 455/450 |
| 10,264,499 | B2 | 4/2019 | Kovacs et al. | |
| 2009/0034725 | A1* | 2/2009 | Davies, Sr. | H04L 63/08 380/255 |
| 2011/0306345 | A1* | 12/2011 | Wu | H04W 24/10 455/436 |
| 2012/0166582 | A1* | 6/2012 | Binder | H04L 63/18 709/217 |
| 2018/0063014 | A1 | 3/2018 | Yu et al. | |
| 2018/0124771 | A1* | 5/2018 | Mok | H04W 72/048 |
| 2018/0359811 | A1 | 12/2018 | Verzun et al. | |
| 2019/0069176 | A1* | 2/2019 | Huang | H04W 12/06 |

(Continued)

FOREIGN PATENT DOCUMENTS

WO  2019133049 A1  7/2019

OTHER PUBLICATIONS

Johan De Vriendt, Philippe Lainé, Christophe Lerouge, and Xiaofeng Xu, "Mobile Network Evolution: A Revolution on the Move", 2002, IEEE, p. 104-111 (Year: 2002).*

*Primary Examiner* — Catherine Thiaw
(74) *Attorney, Agent, or Firm* — Sterne, Kessler, Goldstein & Fox P.L.L.C.

(57) ABSTRACT

A method is disclosed, comprising dividing an outgoing message into a plurality of shards, and generating an error correction code corresponding to the outgoing message. The method may also include transmitting a first shard and a second shard of the plurality of shards to a core network via a radio access network (RAN). The first shard and the second shard are encrypted and the second shard is transmitted after a configurable time interval after transmitting the first shard.

20 Claims, 4 Drawing Sheets

(56) References Cited

U.S. PATENT DOCUMENTS

| | | |
|---|---|---|
| 2019/0104432 A1* | 4/2019 | Dhanapal .............. H04W 76/10 |
| 2019/0140967 A1* | 5/2019 | Deval ..................... H04L 47/36 |
| 2019/0141536 A1 | 5/2019 | Bachmutsky et al. |
| 2019/0208032 A1* | 7/2019 | Sivasubramanian ........................ H04L 69/324 |
| 2019/0297553 A1* | 9/2019 | Wang .................... H04W 36/18 |
| 2019/0313302 A1* | 10/2019 | Lin ....................... H04W 36/08 |
| 2019/0387079 A1* | 12/2019 | Pismenny ............. H04L 69/168 |

* cited by examiner

MULTI CELL PHONE TOWER INFORMATION TRANSFER SECURITY

BACKGROUND

International Mobile Subscriber Identity (IMSI) catchers, also known as cell-site simulators, pose a privacy threat to mobile phone users because they trick mobile phones within a certain radius into connecting to the IMSI catcher instead of an actual cellular tower. The IMSI catcher provides valuable assistance to law enforcement agencies for various public safety objectives, for example, a fugitive apprehension effort, a complex narcotics investigation, or to locate or rescue a kidnapped child. Thus, IMSI catchers can provide a public benefit when used for legal ends. But, when an IMSI catcher is available to hackers, the IMSI catcher may be used to steal valuable information of mobile phone users within a certain radius of the stingray tower. The mobile phone user may perform transactions requiring privacy and security while being connected to the IMSI catcher, resulting in the IMSI catcher storing private and sensitive information from the transactions. The hackers may then misuse the stolen information for malicious purposes.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
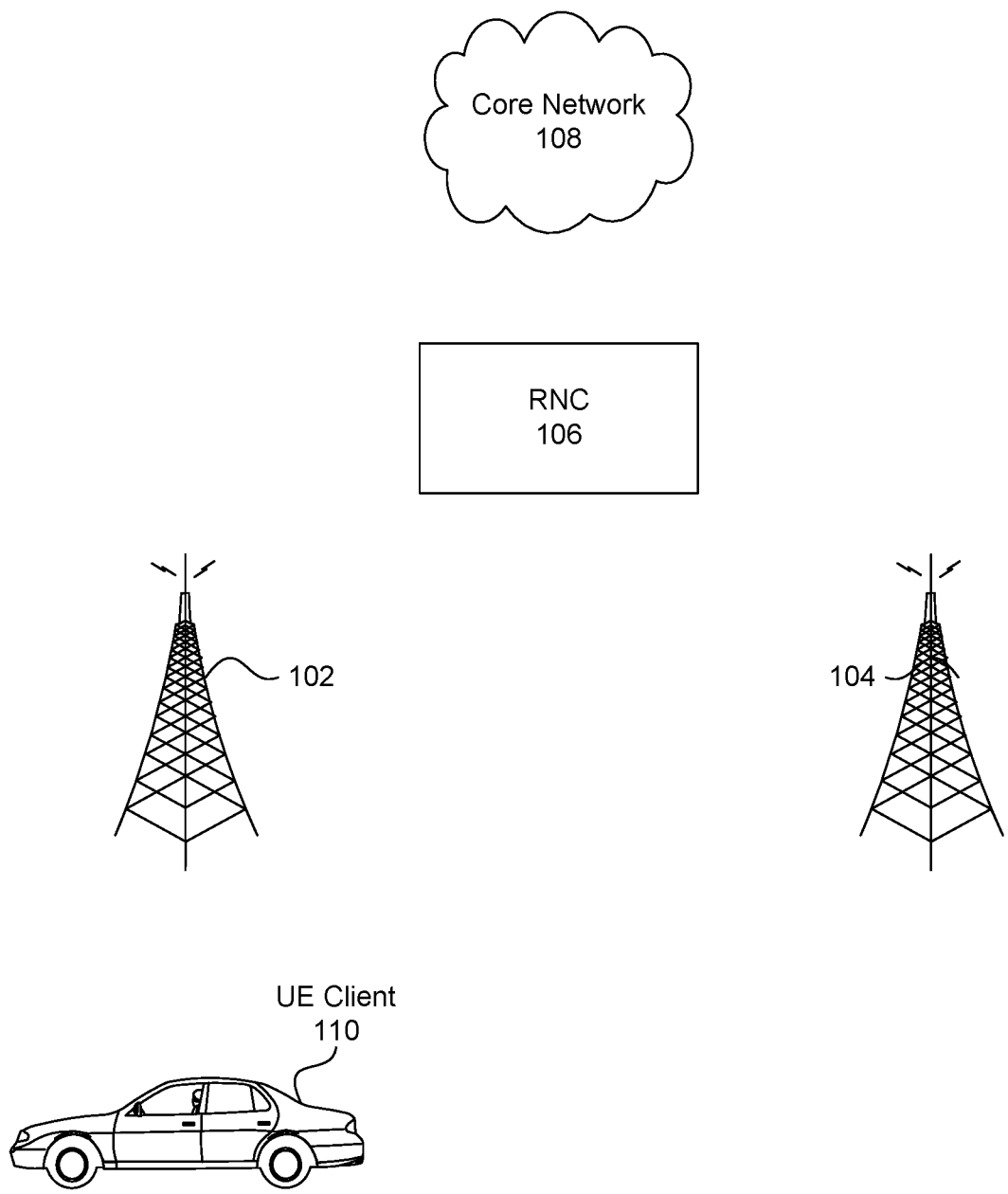
FIG. 1 illustrates an exemplary network, in accordance with some embodiments.

Provided herein are a method, a system, and a computer program product embodiments, and/or combinations and sub-combinations thereof, for secure information transfer via multiple cell phone towers.

Generally, a message from a user equipment (UE) device is sent to a core network or a backend server immediately and as a single message, when the UE device is connected to the core network via a base station in a radio access network (RAN). When the message is of large size, the message may be fragmented in more than one segment, and all the segments are transmitted immediately to the core network or the backend server. If the base station to which the UE device is connected is an IMSI catcher under control of hackers, the message either as a single message or multiple segments of a fragmented message may be sent to the core network via the IMSI catcher. The IMSI catcher thus can receive the entire message, and even though the message may be encrypted before sending from the UE device, the hackers may be able to decrypt the message and steal personal and private details in the message. However, if the encrypted message from the user equipment (UE) device is divided into multiple segments and transmitted via multiple cell phone towers the IMSI catcher under control of hackers may receive only a partial message. Since the message is encrypted, the hackers upon receiving only the partial encrypted message may not be able to obtain private and sensitive information in the message. Accordingly, the message may be securely transmitted.

An objective of the present application is to transmit a message or information containing private and sensitive information securely to a core network. For example, the message or information containing private and sensitive information may be a financial transaction being performed using a mobile application or a native browser application of a user equipment (UE) device.

As described above, while the UE device is within a certain radius of the IMSI catcher, the UE device may receive a stronger cellular signal from the IMSI catcher instead of another cellular tower. This may cause the UE device to latch to the IMSI catcher to communicate to the core network over a radio access network (RAN). The UE device user unknown to the UE device being latched to the IMSI catcher may perform a transaction, for example, a financial transaction, using a mobile application or a web browser that may cause a message or information being transmitted from the UE device to the core network. If the entire message or information is sent immediately and in one piece, the IMSI catcher may receive the entire message. Accordingly, even if the message or information may be encrypted by the UE device before transmitted to the core network, the IMSI catcher may be able to decrypt the message or information. By way of non-limiting example, the message or information may comprise one of financial information, health information, and personal information such as social security number and/or a birthdate, etc. Thus, private and sensitive information in the message may be at the risk of the hackers.

In accordance with some embodiments, the UE device may perform a deep packet inspection to identify whether the message comprises any private and sensitive information. The UE device may identify a source of the message, for example, which application on the UE device generated the message. Upon identifying that the source of the message is an application related to finance, health, etc., the UE device may determine that the message may include private and sensitive information and require protection from IMSI catcher. By way of non-limiting example, a UE device user may activate a mode on the UE device that may indicate that the message includes private and sensitive information. Upon determining that the message includes private and sensitive information, the UE device may enter into a heightened security mode. In the heightened security mode, the UE device may generate an error correction code based on the entire message or information being transmitted from the UE device to the core network over the RAN.

In accordance with some embodiments, the UE device may divide the entire message or information into a plurality of shards, where the plurality of shards may be configurable. In the following paragraphs, how message is divided into plurality of shards is discussed in detail.

By way of non-limiting example, a total count of shards may depend on the size of the message or a minimum number of shards into which the message may be divided. In some embodiments, the maximum number of shards may also be specified. By way of non-limiting example, the message size may be 8 kilobytes (kb). The minimum number of shards may be eight, for example. Accordingly, each shard may be of 1 kb. The data unit of the message, for the example above, may be a byte. Accordingly, the UE device may assign each byte of the message to a shard of the plurality of shards.

Assignment of the message bytes to a shard of the plurality of shards may be in round-robin, random, and/or user-specified order. By way of non-limiting example, for the message being divided into three shards in the round-robin order, the first byte of the message may be assigned to the first shard, the second byte of the message may be assigned to the second shard, and the third byte of the message may be assigned to the third shard. The subsequent bytes may then be assigned similarly. In the random order, the first byte may be assigned to the second shard, the second byte may be assigned to the first shard, and the third byte may be assigned to the third shard. In the random scheme, the index of each byte is stored along the information, allowing for reconstruction of the message at the destination. For the user-specified order, the UE device may be configured with a specific order of byte and shard assignment. The specific order of byte and shard assignment may be periodically updated according to the instructions received via an update from the core network. The update from the core network may be over-the-air (OTA).

In accordance with some embodiments, after the message is divided into the plurality of shards, each shard of the plurality of shards may be encrypted. By way of non-limiting example, each shard may be encrypted using the same encryption key, or each shard may be encrypted using an encryption key selected from a plurality of encryption keys configured/provisioned at the UE device. Accordingly, the first shard may be encrypted using a first encryption key and the second shard may be encrypted using a second encryption key. The first encryption key may be different from the second encryption key. The first encrypted shard may be sent immediately via a first base station of the plurality of base stations in the RAN. The first base station is the base station to which the UE device is currently latched. The first base station may be that of an IMSI catcher, an actual cellular tower, or may be a Wi-Fi access point to which the UE device may be currently latched/connected. The first shard, the second shard, etc., here refer to the order in which a shard of the plurality shards may be transmitted from the UE device to the core network.

In accordance with some embodiments, after transmitting the first encrypted shard from the UE device to the core network, the second encrypted shard may be transmitted after a configurable time delay period. Accordingly, if the UE device is in motion, the UE device may have likely travelled outside a range of the IMSI catcher. The UE device has travelled outside the range of the IMSI catcher may also be guaranteed based on handover of the UE device from the first base station to a second base station of the plurality of base stations in the RAN. Accordingly, the second shard may be transmitted by the UE device to the core network either upon the configurable time period or after the handover from the first base station to the second base station. By way of non-limiting example, a location of the UE device may be marked when the first encrypted shard is transmitted from the UE device, and the second encrypted shard may be transmitted from the UE device when the UE device has moved by a certain configurable distance from the location at which the first shard was transmitted.

In accordance with some embodiments, the error correction code calculated based on the entire message may also be transmitted to the core network. Accordingly, if there is any corruption in one or more shards, the entire message may still be determined by the core network using the error correction code. By way of non-limiting example, the error correction code may be a cyclic redundancy check (CRC). However, other error correction codes as known to a person skilled in the art may also be used. Using the error correction code like CRC, an entire message may still be recovered when a corrupted shard is intercepted by an IMSI catcher, or the UE device may randomly select a shard to not transmit to the core network. So if there are total n shards, the UE device may transmit either n or (n−1) shards to the core network. The UE device may transmit n or (n−1) with a configurable time period between two shards being transmitted from the UE device or when a new base station is detected and handover of the UE device occurs to the new base station.

Accordingly, an IMSI catcher in the control of hackers may not be able to receive all or all but one shards of the message. Therefore, the hackers may not be able to steal private and sensitive information of the UE device user.

Various embodiments of these features will now be discussed with respect to the corresponding figures.

FIG. 1 illustrates an exemplary network, in accordance with some embodiments. A network 100 shown in FIG. 1 comprises a core network 108, and a radio access network (RAN) comprising radio network controller (RNC) 106, a first base station 102, a second base station 104 in the RAN, and user equipment (UE) device or UE client 110. The UE device may be a smart phone, a table, a computer, a smart watch, or any other device that may allow a device user to perform transactions while being mobile. Though, only two base stations 102 and 104 are shown in the RAN, there may be more than two base stations in the RAN. Any of the base stations in the RAN may be an IMSI catcher. The UE device 110 within a certain radius may latch/connect to the base station from which a stronger cellular signal is received. Accordingly, if the UE device 110 is closer to the base station 102 in comparison with the base station 104, the UE device 110 may receive a strong cellular signal from the base station 102. Accordingly, the UE device 110 may connect to the base station 102 to communicate with the core network 108 via the RNC 106 over the RAN.

In accordance with some embodiments, when in the UE device 110 the user performs a transaction comprising private and sensitive information, the UE device 110 may perform a deep packet inspection to identify whether the message comprises any private and sensitive information. The UE device 110 may identify a source of the message, for example, which application on the UE device 110 generated the message. Upon identifying that the source of the message is an application related to finance, health, etc., the UE device 110 may determine that the message may include private and sensitive information and require protection from IMSI catcher. By way of non-limiting example, a UE device 110 user may activate a mode on the UE device 110 that may indicate that the message includes private and sensitive information. Upon determining that the message includes private and sensitive information, the UE device may enter into a heightened security mode. In the heightened security mode, the UE device may generate an error correction code based on the entire message or information being transmitted from the UE device to the core network over the RAN. The core network may comprise a cloud network system. The core network may also comprise an application server, which may be the backend system or backend server to receive the message or information from the UE device, and execute according to the message.

Figure 2:
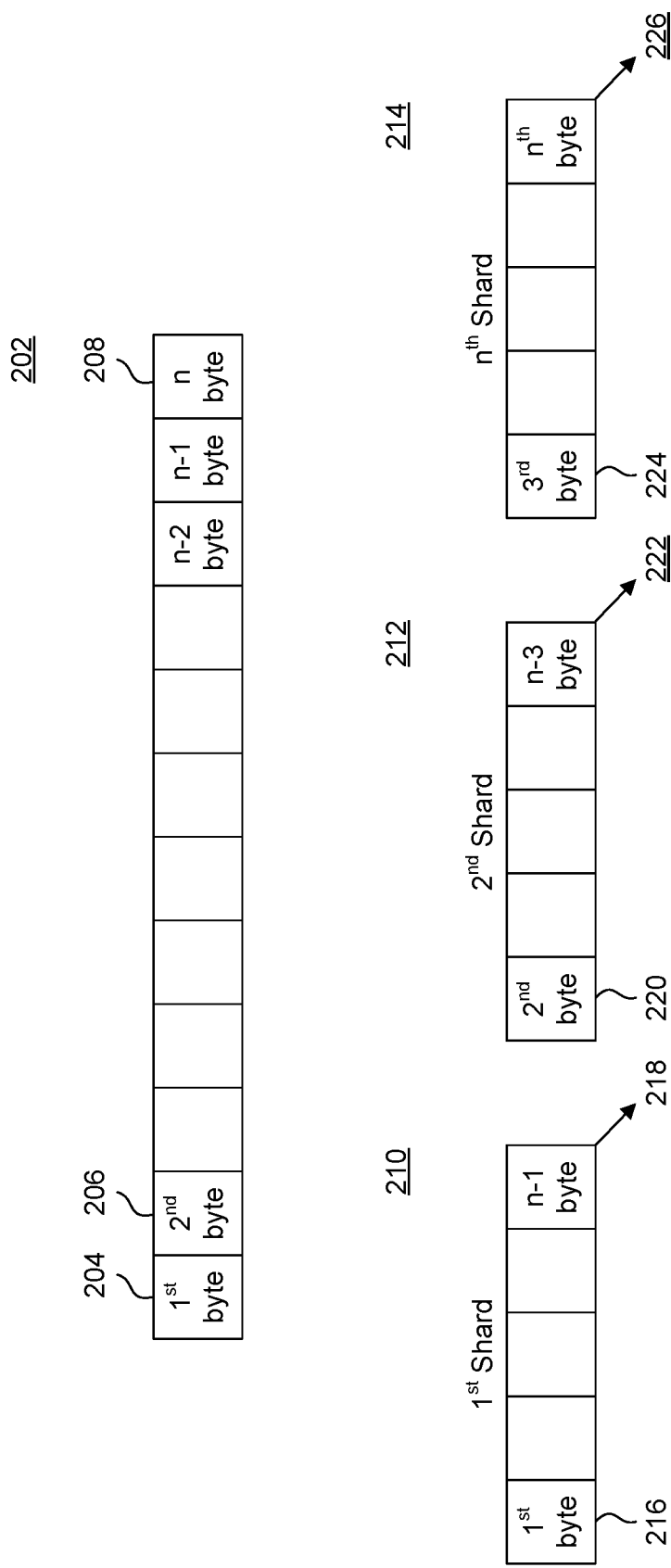
FIG. 2 illustrates an exemplary message, in accordance with some embodiments.

FIG. 2 illustrates an exemplary message, in accordance with some embodiments. The message 202 is of n bytes. The UE device 110 may divide the message 202 into a plurality of shards. In FIG. 2, a first shard 210, a second shard 212, and nth shard 214 are shown. While only three shards are shown in FIG. 2, the total number of shards may be configurable. By way of non-limiting example, a total count of shards may depend on the size of the message 202 or a minimum number of shards into which the message 202 may be divided. In some embodiments, the maximum number of shards may also be specified. By way of non-limiting example, the message size may be 8 kilobytes (kb). The minimum number of shards may be eight, for example. Accordingly, each shard may be of 1 kb. The data unit of the message 202, for the example above, may be byte. Accordingly, the UE device 110 may assign each byte of the message to a shard of the plurality of shards. Assignment of the message bytes to a shard of the plurality of shards may be in round-robin, random, and/or user-specified order.

By way of non-limiting example, for the message being divided into three shards in the round-robin order, the first byte of the message may be assigned to the first shard, the second byte of the message be assigned to the second shard, and the third shard may be assigned to the third shard. The subsequent bytes may then be assigned similarly. In the random order, the first byte may be assigned to the second shard, the second byte may be assigned to the first shard, and the third byte may be assigned to the third shard. For the user-specified order, the UE device 110 may be configured with a specific order of byte and shard assignment. The specific order of byte and shard assignment may be periodically updated according to the instructions received via an update from the core network. The update from the core network may be over-the-air (OTA).

The first shard 210 may include $1^{st}$ byte 204 of the message 202 as 216, (n−1)th byte as 218, and other bytes of the message 202. The second shard 212 may include $2^{nd}$ byte 206 of the message 202 as 220, (n−3)rd byte as 222 and other bytes of the message 202. The nth shard 214 may include $3^{rd}$ byte as 224, nth byte as 226, and other bytes of the message 202. As can be seen from FIG. 2, the bytes of the message 202 are assigned to a shard of the plurality of shards in any order as specified above. The UE device 110 may determine or calculate an error correction code for the entire message 202. The error correction code for the message 202 may also be transmitted to the core network 108. The error correction code may be transmitted as a unit to the core network. By way of non-limiting example, the error correction code may be a cyclic redundancy check (CRC).

The first shard 210 is referenced as a first shard because it is transmitted from the UE device 110 first in a sequence. The second shard 212 is referenced as a second shard because it is transmitted second in the sequence after the first shard. Accordingly, nth shard 214 is the last shard being transmitted in the sequence. As described above, by way of non-limiting example, the second shard 212 may be transmitted after a lapse of a configurable time period since the first shard 210 is transmitted. By way of non-limiting example, the second shard 212 may be transmitted when a new base station is detected and the UE device 110 completes handover to the new base station.

Figure 3:
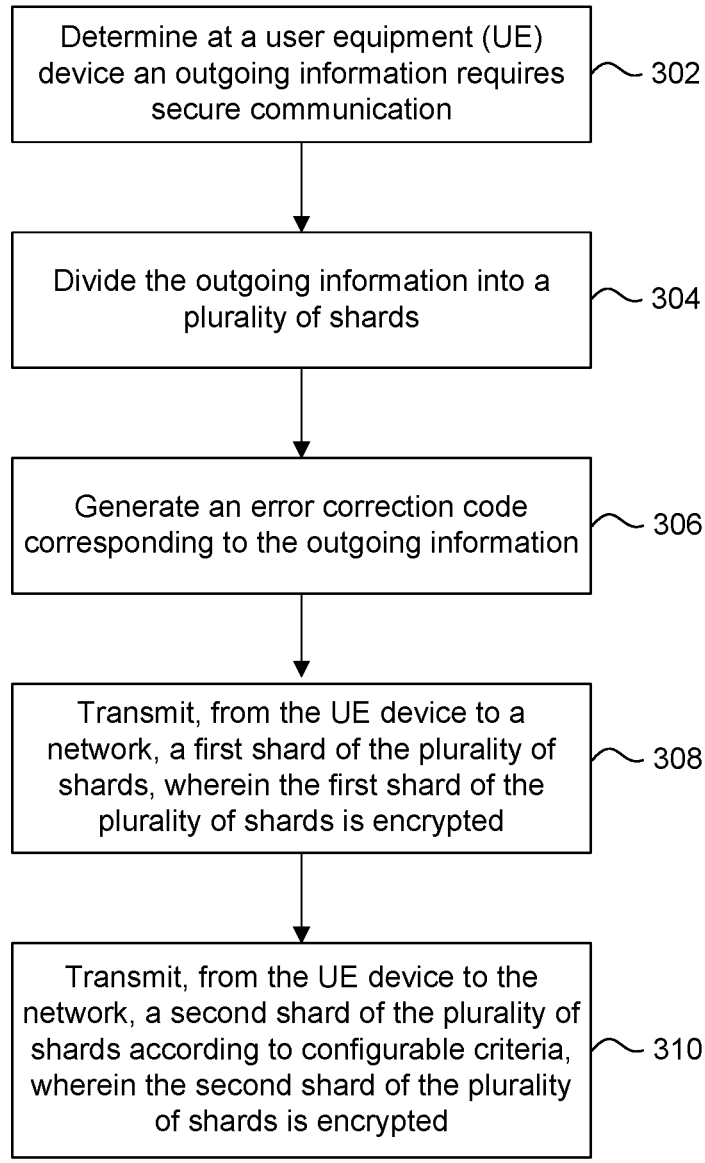
FIG. 3 illustrates a flow chart of steps for transferring a message, in accordance with some embodiments.

FIG. 3 illustrates a flow chart of method steps, in accordance with some embodiments. The method 300 begins at step 302, at which, the UE device 110 may determine that the message comprises private and sensitive information as described above, and may divide the message 202 into a plurality of shards at step 304 as described above. At step 306, the UE device 110 may generate or calculate an error correction code corresponding to the message 202. The error correction code may be transmitted to the core network as a unit. At step 308, the UE device may transmit the first shard 210 to the core network via a first base station in the RAN. The first shard 210 may be encrypted as described herein.

At step 310, the UE device may transmit the second shard 212 after a lapse of configurable time period from transmitting the first shard to the core network. The UE device 110 may, alternatively, transmit the second shard when a handover of the UE device 110 occurs to a new base station detected by the UE device 110. As described above, the message is divided into plurality of shards, and to keep private and personal details in the message secure from the IMSI catcher, there is a time delay between transmission of two shards. The time delay between transmission of two shards may be as a result of a configurable option based on either a configured time delay or a handover requirement of the UE from one base station to another base station. As described above, each shard transmitted from the UE device 110 is encrypted. Accordingly, the receiver of the shard (for example the core network) may decrypt each shard to put together the message 202 received as plurality of shards.

Figure 4:
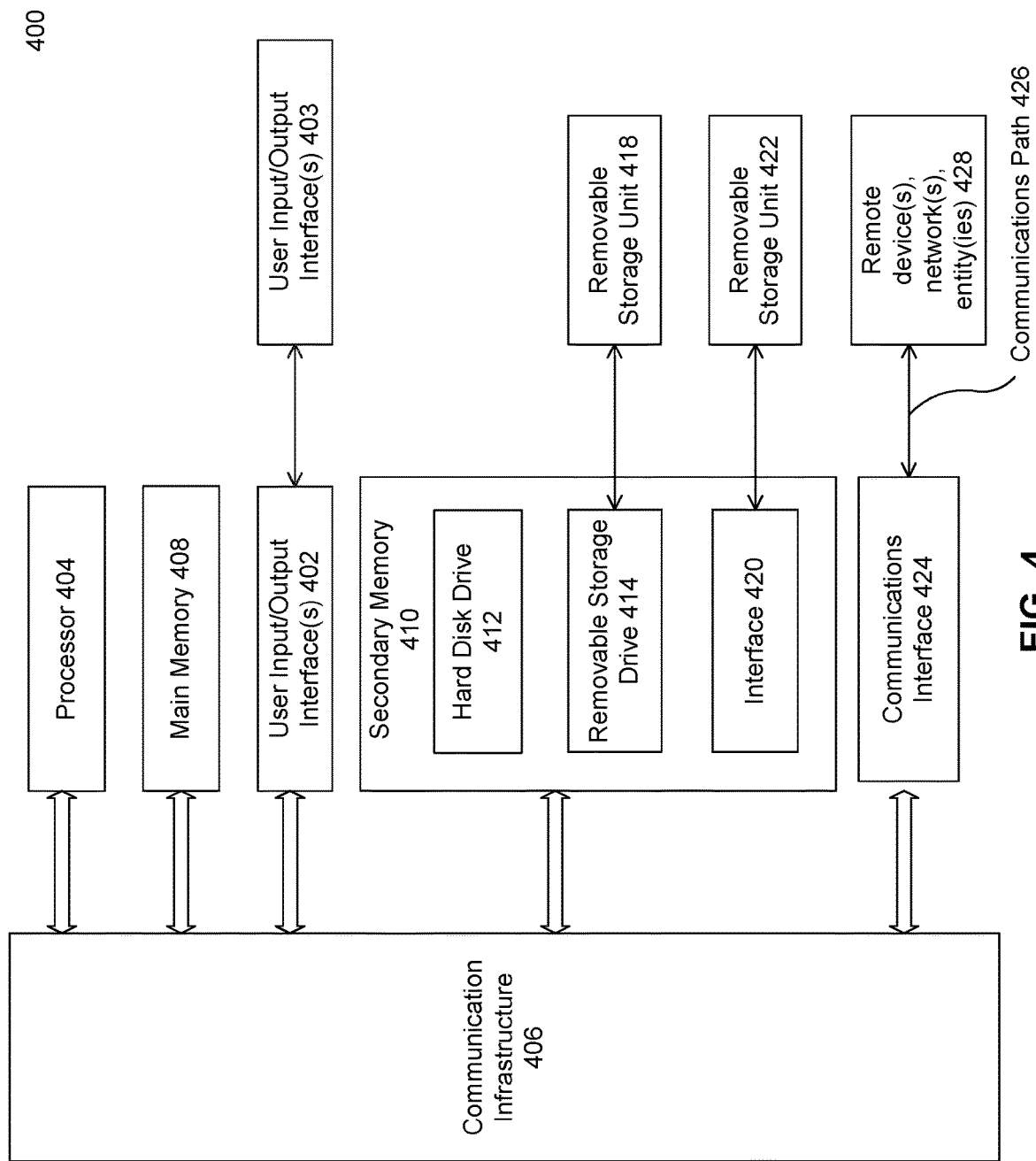
FIG. 4 illustrates an exemplary computer system, in accordance with some embodiments.

FIG. 4 illustrates an example of a computer system, in accordance with some embodiments.

Various embodiments may be implemented, for example, using one or more well-known computer systems, such as a computer system 400 as shown in FIG. 4. One or more computer systems 400 may be used, for example, to implement any of the embodiments discussed herein, as well as combinations and sub-combinations thereof.

The computer system 400 may include one or more processors (also called central processing units, or CPUs), such as a processor 404. The processor 404 may be connected to a communication infrastructure or bus 406.

The computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 400 may also include a main or primary memory 408, such as random access memory (RAM). Main memory 408 may include one or more levels of cache. Main memory 408 may have stored therein control logic (i.e., computer software) and/or data.

The computer system 400 may also include one or more secondary storage devices or memory 410. The secondary memory 410 may include, for example, a hard disk drive 412 and/or a removable storage device or drive 414. The removable storage drive 414 may be a floppy disk drive, a magnetic tape drive, a compact disk drive, an optical storage device, tape backup device, and/or any other storage device/drive.

The removable storage drive 414 may interact with a removable storage unit 418. The removable storage unit 418 may include a computer usable or readable storage device having stored thereon computer software (control logic) and/or data. The removable storage unit 418 may be a floppy disk, magnetic tape, compact disk, DVD, optical storage disk, and/any other computer data storage device. The removable storage drive 414 may read from and/or write to removable storage unit 418.

The secondary memory 410 may include other means, devices, components, instrumentalities or other approaches for allowing computer programs and/or other instructions and/or data to be accessed by the computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 400 may further include a communication or network interface 424. The communication interface 424 may enable the computer system 400 to communicate and interact with any combination of external devices, external networks, external entities, etc. (individually and collectively referenced by reference number 428). For example, the communication interface 424 may allow the computer system 400 to communicate with the external or remote devices 428 over communications path 426, which may be wired and/or wireless (or a combination thereof), and which may include any combination of LANs, WANs, the Internet, etc. Control logic and/or data may be transmitted to and from the computer system 400 via the communication path 426.

The computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

The computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer usable or readable medium having control logic (software) stored thereon may also be referred to herein as a computer program product or program storage device. This includes, but is not limited to, the computer system 400, the main memory 408, the secondary memory 410, and the removable storage units 418 and 422, as well as tangible articles of manufacture embodying any combination of the foregoing. Such control logic, when executed by one or more data processing devices (such as the computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method, comprising:
    dividing, by one or more computing devices, an outgoing message into a plurality of shards;
    transmitting, by the one or more computing devices, a first shard of the plurality of shards to a core network via a radio access network (RAN), wherein the first shard of the plurality of shards is encrypted;
    identifying, by the one or more computing devices, a first location from which the first shard is transmitted to the core network; and
    upon transmitting the first shard, transmitting, by the one or more computing devices, from a second location, a second shard of the plurality of shards to the core network via the RAN, wherein the second location is at least a configurable distance away from the first location for securely transmitting the first shard and the second shard to the core network via the RAN, wherein the first shard and the second shard contain data of the outgoing message according to a configurable assignment order that is periodically updated based on an instruction received from the core network, and wherein the second shard of the plurality of shards is encrypted.

2. The method of claim 1, wherein the transmitting the second shard is after a configurable time interval after the transmitting the first shard.

3. The method of claim 1, wherein the transmitting the second shard is after a handover from a first base station of the RAN to a second base station of the RAN and after the transmitting the first shard.

4. The method of claim 1, wherein the dividing the outgoing message comprises:

splitting, by the one or more computing devices, the outgoing message into a plurality of data units; and associating, by the one or more computing devices, each data unit of the plurality of data units to a shard of the plurality of shards according to the configurable assignment order.

5. The method of claim 4, wherein the configurable assignment order comprises one of round-robin, random, and user-specified.

6. The method of claim 1, wherein the dividing the outgoing message into the plurality of shards is based on at least one of a size of the outgoing message, and a number of minimum shards required.

7. The method of claim 1, wherein the first shard is encrypted using a first encryption key and the second shard is encrypted using a second encryption key.

8. The method of claim 1, further comprising generating, by the one or more computing devices, an error correction code corresponding to the outgoing message.

9. The method of claim 1, further comprising verifying, by the one or more computing devices, the second location is being served by a second base station different from a first base station that served at the first location.

10. The method of claim 1, wherein the instruction is received over-the-air (OTA) via an update from the core network.

11. A user equipment (UE) device, comprising:

a memory for storing operations; and one or more processors, communicatively coupled to the memory, configured to perform the operations comprising:

dividing an outgoing message into a plurality of shards;

transmitting a first shard of the plurality of shards to a core network via a radio access network (RAN), wherein the first shard of the plurality of shards is encrypted;

identifying a first location from which the first shard is transmitted to the core network; and upon transmitting the first shard, transmitting, from a second location, a second shard of the plurality of shards to the core network via the RAN, wherein the second location is at least a configurable distance away from the first location for securely transmitting the first shard and the second shard to the core network via the RAN, wherein the first shard and the second shard contain data of the outgoing message according to a configurable assignment order that is periodically updated based on instruction received from the core network, and wherein the second shard of the plurality of shards is encrypted.

12. The UE device of claim 11, wherein for the dividing the outgoing message, the operations further comprise:

splitting the outgoing message into a plurality of data units; and associating each data unit of the plurality of data units to a shard of the plurality of shards according to the configurable assignment order.

13. The UE device of claim 12, wherein the configurable assignment order comprises one of round-robin, random, and user-specified.

14. The UE device of claim 11, wherein the dividing the outgoing message into the plurality of shards is based on at least one of a size of the outgoing message, and a number of minimum shards required.

15. The UE device of claim 11, wherein the first shard is encrypted using a first encryption key and the second shard is encrypted using a second encryption key.

16. The UE device of claim 11, wherein operations further comprise generating an error correction code corresponding to the outgoing message.

17. The UE device of claim 16, wherein operations further comprise:

transmitting the error correction code that comprises a cyclic redundancy check (CRC).

18. The UE device of claim 11, wherein the operations further comprise verifying the second location is being served by a second base station different from a first base station that served at the first location.

19. A non-transitory, tangible computer-readable device having instructions stored thereon that, when executed by at least one computing device, causes the at least one computing device to perform operations comprising:

dividing an outgoing message into a plurality of shards;

transmitting a first shard of the plurality of shards to a core network via a radio access network (RAN), wherein the first shard of the plurality of shards is encrypted;

identifying a first location from which the first shard is transmitted to the core network; and upon transmitting the first shard, transmitting, from the second location, a second shard of the plurality of shards to the core network via the RAN, wherein the second location is at least a configurable distance away from the first location for securely transmitting the first shard and the second shard to the core network via the RAN, wherein the first shard and the second shard contain data of the outgoing message according to a configurable assignment order that is periodically updated based on an instruction received from the core network, and wherein the second shard of the plurality of shards is encrypted.

20. The non-transitory, tangible computer-readable device of claim 19, wherein for the dividing the outgoing information, the operations further comprise:

splitting the outgoing message into a plurality of data units; and associating each data unit of the plurality of data units to a shard of the plurality of shards according to the configurable assignment order, wherein the configurable assignment order comprises one of round-robin, random, and user-specified.

* * * * *